SIGNAL SEPARATION MEANS

Filed April 4, 1963 2 Sheets-Sheet 1

MERVIN L. FALK
INVENTOR

BY Robert G. Clay

ATTORNEY

MERVIN L. FALK
INVENTOR.

BY

ATTORNEY 3,265,810

SIGNAL SEPARATION MEANS

Mervin L. Falk, Sunnyvale, Calif., assignor to Ampex Corporation, Redwood City, Calif., a corporation of California Filed Apr. 4, 1963, Ser. No. 270,619
5 Claims. (Cl. 178—5.4)

Figure 1:
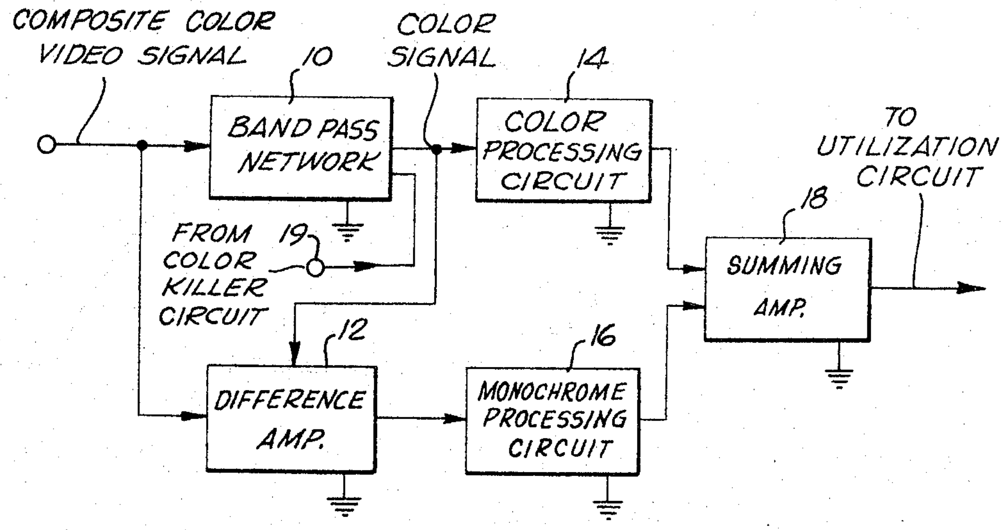

This invention relates to a means for signal separation, and in particular to an improved means for the separation of color and monochrome signal components of a composite color television signal.

There are many instances when it is desirable to separate the components of a composite electrical signal so that one or more signal components may be processed separately. For example, a color television signal comprises a luminance signal that represents the brightness components; horizontal and vertical blanking and synchronizing signals; and a chrominance signal that defines color difference information; and color synchronizing bursts. The monochrome signal, which includes the luminance and horizontal and vertical blanking and synchronizing components generally requires separate processing from the color signal and its associated color burst.

When processing a composite color television signal with one well known television recording system, such as described in U.S. Patents 2,866,012 and 2,956,114, assigned to the same assignee, a rotary head drum transversely scans a longitudinally moving tape during the record and playback modes. The rotary head drum assembly carries a plurality of circumferentially spaced magnetic transducer units that are coupled to separate head channels. During the playback mode, it is necessary to switch between these transducer units in order to combine the signals from the separate head channels, whereby a continuous information output signal is obtained. As a result of the switching process, inter alia, noise signals and undesirable transients may appear and affect the blanking and synchronizing signals that are concurrent with the switching interval. Thus, it has been found necessary to regenerate or reform the blanking and synchronizing signal waveforms when reproducing video information recorded by a transverse scan magnetic tape recorder, so that the waveforms conform to prescribed television broadcast standards. Such regeneration or reformation generally involves signal clipping whereby a portion of the chrominance information is lost, resulting in color balance deterioration. Therefore, if it is desired to achieve signal reformation in a color television signal recording system, in a manner such as described in U.S. Patents 3,029,306 or 3,059,052 for example, the luminance signal with the attendant synchronizing and blanking signals should first be separated from the color information and color burst components of the composite color television signal.

In the prior art, the separation of luminance and color components were achieved by the use of a notch filter and a bandpass filter that were required to be complementary and well matched. The notch filter, generally designated as a "round notch," was set to operate at a center frequency of approximately 3.58 megacycles per second (mc.), which is the color burst frequency set by the United States Federal Communications Commission for a 525 line television raster. (In some countries where another set of standards may be employed and 625 television lines are required, the burst frequency is about 4.43 mc.) If there were any degree of mismatch between the different filters used for signal separation, amplitude and phase distortion would result. This necessity for precise matching led to elaborate filter circuits that were relatively expensive and tedious to construct, and difficult to maintain in proper alignment.

An object of this invention is to provide an improved means for separating a plurality of signals that form a composite signal.

Another object of this invention is to provide a novel means for separating the color and monochrome signal components of a composite color television signal.

In accordance with this invention, a composite signal having a plurality of signal components of different frequencies is applied to a separator circuit that passes only a selected one of the signal components to an output circuit. The composite signal is also fed to a difference amplifier simultaneously with the selected component output signal, whereby a difference signal representing the composite signal less the separated selected signal is derived. Thereafter, the separated signals may be processed in separate channels, and after processing applied to a summing amplifier for recombination.

In a particular embodiment of the invention, a composite color video signal, including luminance and chrominance components is directed to a bandpass network that serves to separate the chrominance component and the color burst from the composite signal. The composite color video signal is also applied to a difference amplifier simultaneously with the separated color signal thereby retrieving the monochrome or luminance signal components, including the blanking and synchronizing pulses. The color and monochrome signals are processed separately and then are recombined in a summing amplifier for reproduction.

Figure 2:
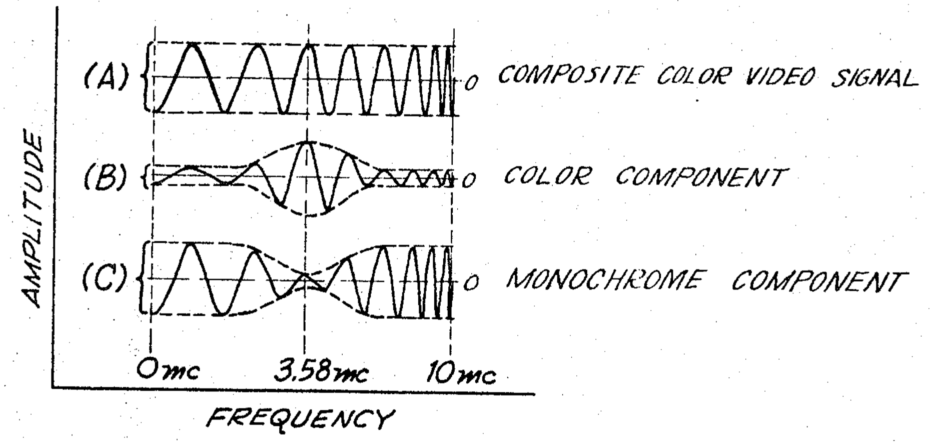
Figure 3:
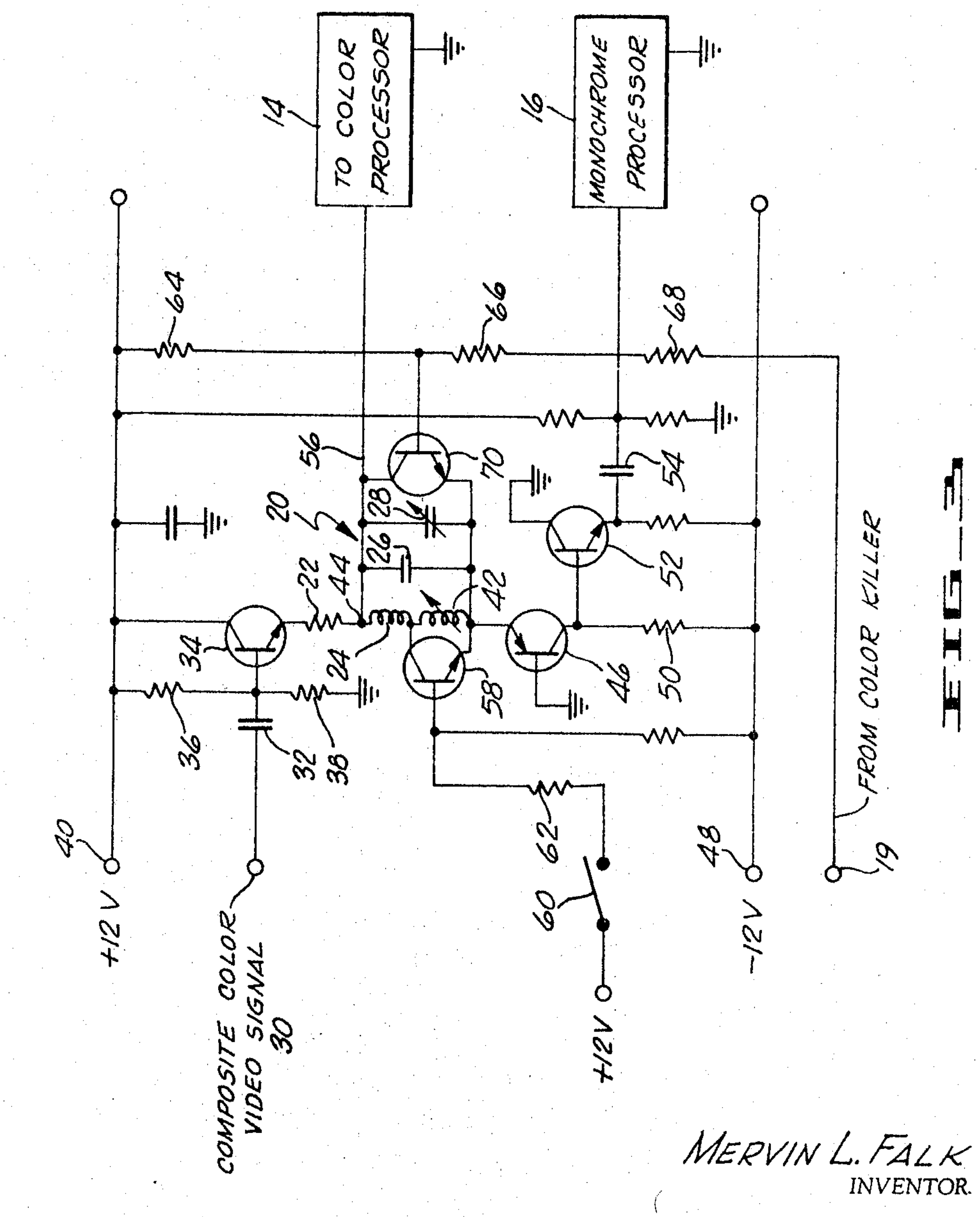

The invention will be described in greater detail with reference to the drawing in which:

FIGURE 1 is a block diagram of the inventive system;

FIGURES 2A–C are a series of representative sweep waveforms, with amplitude plotted against frequency, to aid in the explanation of the invention; and FIGURE 3 is a schematic circuit diagram of an alternative form of signal separating means that may be employed in the system represented in FIGURE 1.

With reference to FIGURE 1 of the drawing, an embodiment of the signal separating system of this invention comprises a bandpass network 10 to which a composite color video signal, received from a demodulator in a magnetic tape playback apparatus, is applied. The bandpass network 10 serves as a filter that effectively passes the color signal component of the composite signal to an output circuit with a minimum of monochrome signal. The signal component that is predominantly color information is then applied to a difference amplifier 12 simultaneously with the composite color video signal whereby the difference signal, representing the monochrome signal components including the luminance, blanking and synchronizing signals, and a very small portion of the chrominance signal are derived. The separated signals are then individually processed, the color video information and the color subcarrier reference signal being processed in a color processing circuit 14, such as described in U.S. Patent 2,979,558, whereas the monochrome components are processed in a circuit 16.

In the monochrome processing circuit 16, the blanking and synchronizing signals are clipped and reconstituted to provide noise-free and reformed signals that comply with television broadcast standards, as achieved by the system set forth in U.S. Patent 3,029,306. At the same time, the color processor 14 acts separately to reblank the color signal. By such separate clipping and reblanking, the color signal is not degraded. After the respective signals have been processed in the circuits 14 and 16, the processed signals are added in a summing amplifier 18 and then supplied to a utilization circuit for subsequent transmission or broadcast. Color killer means 19 may also be provided to disable the chrominance channel in the absence of a proper color burst signal. A color kill signal may be received from a circuit such as set forth in U.S. Patent 2,862,050.

The color video signal sweep waveform is illustrated in FIGURE 2A, which includes both the monochrome and color components. To achieve separate processing of the monochrome and color signals, it is necessary to effectively separate the sweep signal into the respective components, as indicated by FIGURES 2B and 2C. Thus, it is noted that the color signal component (FIGURE 2B) has a maximum amplitude at the subcarrier burst frequency of about 3.58 mc., whereas the monochrome component in the vicinity of the color subcarrier frequency is attenuated. Conversely, the monochrome signal (FIGURE 2C) that is to be applied to the monochrome processor 16 for separate processing has an attenuated chrominance component at the subcarrier frequency of 3.58 mc.

In FIGURE 3, a particular embodiment of the bandpass network 10 operating in conjunction with the difference amplifier 12 is illustrated. The network 10 comprises a filter or parallel resonant circuit 20 that includes a resistor 22, a fixed inductance 24, a fixed capacitance 26 and a variable capacitance 28. In order to set the bandpass network 10 for proper operation so that a modulated subcarrier of a predetermined frequency (3.58 mc. in this example) may be separated, a sweep frequency signal that may range from zero to ten megacycles per second is applied to an input terminal 30. The sweep signal is passed through a coupling capacitor 32 to the base of a transistor 34 which serves as an emitter follower. Between the capacitor 32 and the transistor base, a pair of biasing resistors 36 and 38 are coupled in series between a source of positive potential 40 and ground. The emitter of the transistor 34 is connected to the resistor 22 of the filter circuit 20, whereas the transistor collector is connected to a source of positive potential 40. Connected in series with the resistor 22 and the inductance 24 is a variable inductance 42, which in combination with the variable capacitance 28, determines the frequency of the signal component that is to be separated.

During the set-up process when the variable capacitor 28 and inductance 42 are being adjusted, the sweep signal beginning at zero megacycles is applied at the input terminal 30. Initially, the existing impedance at a junction point 44 coupled between the resistance 22 and the fixed inductance 24 is very low relative to ground, and the signal is passed through the inductances 24 and 42 to a grounded base amplifier transistor 46, having its collector coupled to a source of negative potential 48 through a load resistor 50. An output signal having the amplitude of the sweep frequency signal is derived from the collector of the amplifier 46 and fed through an emitter follower 52 and a coupling capacitor 54 to a processor, such as the monochrome processing circuit 16. Thus, the transistor 46 serves as an amplifier to supply the composite signal less the separated signal to an output circuit.

However, as the frequency of the sweep signal is increased, the impedance presented by the resonant circuit 20 at the predetermined frequency (3.58 mc.), which has been established by the settings of the variable resistor 28 and inductor 42, is such that the signal derived from the emitter of the transistor 34 is directed through a lead 56 to another processor, such as the color processing circuit 14. The output signal received by the color processor 14 at any time is complementary to the output signal applied to the processor 16. Thus, it is seen that the resonant circuit 20 acts like a variable resistance in a voltage divider circuit, in conjunction with the fixed resistance 22. When the dynamic impedance of the circuit 20 exceeds the resistance of the resistor 22, the output signal is directed through the lead 56 to the color processor 14 in lieu of the monochrome processor 16. Thereafter, as the sweep frequency increases past the predetermined frequency, which is 3.58 megacycles in a color signal processing apparatus, the impedance of the resonant circuit 20 is decreased such that the video signal (FIGURE 2C) is channeled to the monochrome processor 16.

In operation, a composite frequency modulated color video signal (FIGURE 2A) is applied to the input terminal 30. The bandpass network 20 that has been previously adjusted resonates at the frequency of the color burst signal as a result of the adjusted capacitance 28 and inductance 42, and causes the chrominance signal (FIGURE 2B) to pass through lead 56 to the color processor 14. Concomitantly, the monochrome signal (FIGURE 2C) is channeled through transistors 46 and 52 to the monochrome processing circuit 16.

When it is desired to provide a color burst signal of a frequency other than 3.58 mc., a standards conversion circuit comprising a transistor 58 and a switch 60 is utilized. When the switch 60 is closed thereby coupling a source of positive potential to the base of the transistor 58 through a biasing resistor 62, the transistor 58 is driven into conduction. As the emitter and collector of the transistor 58 are shunted across the variable inductance 42, the inductive characteristic and the resonant frequency of the circuit 20 is varied. In this manner, a color information signal that modulates a 4.43 mc. subcarrier may be processed in a 50 fields per second television system, by way of example.

Also, when it is necessary to turn off the chrominance channel so as to present monochrome information only, a signal received from a color killer circuit 19 is applied through a voltage divider comprising series resistors 64, 66 and 68 to the base of a transistor 70 that is connected across the variable capacitor 28. In the presence of a color kill signal, the transistor 70 blocks the chrominance signal from reaching the color processor 14, whereby only the monochrome signal is passed to the monochrome processor 16.

In this manner, a separation circuit that eliminates the necessity for complex filters and excessive maintenance is provided for a color signal television system. It is understood that the separation circuit of this invention is not limited only to a color television signal processing system. The inventive separation circuit is simple to construct and economical to maintain and achieves signal separation in an expedient way. Furthermore, the filter circuit may take other forms than the parallel resonant circuit depicted herein. This invention may employ any two-terminal bandpass, low pass, high pass, band elimination circuit, or the like that may be used for the separation of signal components of different frequencies. Also, it should be noted that the frequencies and voltages illustrated in the specification and drawings are only exemplary, and thus may be varied within the scop of this invention.

What is claimed is:

1. A system for processing a plurality of signal components that form a composite signal comprising means for deriving a composite signal having different frequency components, a parallel resonant circuit having first and second terminals at the opposite ends thereof, said resonant circuit having a resonant frequency approximately equal that of a first of said frequency components, said first terminal coupled in series with the deriving means to receive said composite signal therefrom whereby said first component and a second component comprising the composite signal less said first component respectively appear at said first and second terminals, means coupled to said first and second terminals for separately processing said first and second components appearing thereat, and means coupled to the separate processing means for reconstituting the processed signal components to provide the composite signal.

2. A system according to claim 1, further defined by means coupled in parallel with said resonant circuit for selectively providing a current path between said first and second terminals to bypass said first component of said composite signal therebetween.

3. A system for processing separately the color and monochrome signal components of a composite color video signal comprising a capacitance and inductance connected in parallel to define a resonant circuit having first and second terminals at the opposite ends thereof, said resonant circuit tuned to the frequency of the color component of said composite signal, a first transistor connected in emitter-follower configuration, said transistor having its emitter-collector path coupled in series with said first terminal of said resonant circuit, means for applying said composite signal to the base of said first transistor, a color processor circuit coupled to said first terminal of said resonant circuit, a second transistor connected in grounded base configuration, said second transistor having its emitter connected to said second terminal of said resonant circuit, a third transistor connected in emitter-follower configuration, said third transistor having its base connected to the collector of said second transistor, a monochrome processor circuit coupled to the emitter of said third transistor, and a summing amplifier coupled to said color processor and monochrome processor circuits to combine the outputs thereof.

4. A system according to claim 3, further defined by a fourth transistor having its emitter-collector path connected between said first and second terminals of said resonant circuit, and means coupled to the base of said fourth transistor for selectively forward biasing same.

5. A system according to claim 4, further defined by a fifth transistor having its emitter-collector path connected in parallel with a portion of said inductance, and means coupled to the base of said fifth transistor for selectively forward biasing same.

References Cited by the Examiner

UNITED STATES PATENTS

| | | | |
|---|---|---|---|
| 1,712,026 | 5/1929 | Clark | 333—76 |
| 2,921,976 | 1/1960 | Johnson | 178—6.6 |
| 3,029,306 | 4/1962 | Dolby | 178—6.6 |
| 3,167,611 | 1/1965 | St. John | 178—5.4 |

DAVID G. REDINBAUGH, *Primary Examiner.*

T. A. GALLAGHER, *Assistant Examiner.*